(12) United States Patent
Sun et al.

(10) Patent No.: US 9,025,555 B2
(45) Date of Patent: May 5, 2015

(54) METHOD AND APPARATUS FOR ESTABLISHING NETWORK IN WIRELESS NETWORK

(75) Inventors: Bo Sun, Shenzhen (CN); Kaiying Lv, Shenzhen (CN); Nan Li, Shenzhen (CN); Feng Li, Shenzhen (CN); Li Zhang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 121 days.

(21) Appl. No.: 13/882,174

(22) PCT Filed: Oct. 19, 2011

(86) PCT No.: PCT/CN2011/080986
§ 371 (c)(1),
(2), (4) Date: May 2, 2013

(87) PCT Pub. No.: WO2012/055331
PCT Pub. Date: May 3, 2012

(65) Prior Publication Data
US 2013/0215863 A1  Aug. 22, 2013

(30) Foreign Application Priority Data
Oct. 29, 2010  (CN) .......................... 2010 1 0526382

(51) Int. Cl.
*H04W 4/00* (2009.01)
*H04B 7/212* (2006.01)
(Continued)

(52) U.S. Cl.
CPC .............. *H04W 72/04* (2013.01); *H04W 16/14* (2013.01); *H04W 84/12* (2013.01)

(58) Field of Classification Search
USPC ......................................................... 370/329
See application file for complete search history.

(56) References Cited

U.S. PATENT DOCUMENTS 7,061,891 B1 *  6/2006  Kilfoyle et al. ............... 370/335
7,359,351 B2     4/2008  Cho
(Continued)

FOREIGN PATENT DOCUMENTS

CN  1675954 A  9/2005
CN  1787472 A  6/2006
(Continued)

OTHER PUBLICATIONS

International Search Report in international application No. PCT/CN2011/080986, mailed on Jan. 12, 2012.
(Continued)

*Primary Examiner* — Gerald Smarth
(74) *Attorney, Agent, or Firm* — Neifield IP Law, PC

(57) ABSTRACT

The disclosure provides a method and an apparatus for establishing a network in a wireless network. The method includes: a wireless station selects a working channel and a primary channel which satisfy a bandwidth requirement and an interference level in a channelized set within a given frequency band according to local configuration information and/or through channel scanning and interference detection; and the wireless station establishes a network according to the selected working channel and primary channel. Through the disclosure, a wireless network compatible with the current Wireless Local Area Network (WLAN) can be established according to the configuration information or scanning result when the wireless station supports multiple channelized set schemes within a given frequency band, and the utilization of available spectrum resources is maximized.

16 Claims, 2 Drawing Sheets

--- a wireless station selects a working channel and a primary channel which satisfy a bandwidth requirement and an interference level in a channelized set within a given frequency band according to local configuration information and/or through channel scanning and interference detection — 101 the wireless station establishes a network according to the selected working channel and primary channel — 102

(51) Int. Cl.
*H04W 72/04* (2009.01)
*H04W 16/14* (2009.01)
*H04W 84/12* (2009.01)

(56) References Cited

U.S. PATENT DOCUMENTS

| | | |
|---|---|---|
| 7,395,064 B2 | 7/2008 | Demirhan |
| 7,426,182 B1 | 9/2008 | Wang et al. |
| 2004/0037247 A1 | 2/2004 | Ngo |
| 2004/0090924 A1* | 5/2004 | Giaimo et al. ............... 370/252 |
| 2006/0014536 A1 | 1/2006 | Demirhan |
| 2006/0120324 A1 | 6/2006 | Cho |
| 2007/0104176 A1* | 5/2007 | Ji et al. ............... 370/348 |
| 2007/0242600 A1* | 10/2007 | Li et al. ............... 370/210 |
| 2008/0051097 A1* | 2/2008 | Kwon ............... 455/450 |
| 2008/0181155 A1* | 7/2008 | Sherman et al. ............... 370/311 |
| 2010/0061318 A1* | 3/2010 | Chiu et al. ............... 370/329 |

FOREIGN PATENT DOCUMENTS

| | | |
|---|---|---|
| CN | 1881917 A | 12/2006 |
| CN | 101015172 A | 8/2007 |
| CN | 101170539 A | 4/2008 |
| CN | 101790201 A | 7/2010 |

OTHER PUBLICATIONS

English Translation of the Written Opinion of the International Search Authority in international application No. PCT/CN2011/080986, mailed on Jan. 12, 2012.

* cited by examiner

METHOD AND APPARATUS FOR ESTABLISHING NETWORK IN WIRELESS NETWORK

TECHNICAL FIELD

The disclosure relates to the field of wireless communications, and in particular to a method and an apparatus for establishing a network in a wireless network.

BACKGROUND

At present, Wireless Local Area Network (WLAN) develops rapidly in the field of wireless network, and a demand is for WLAN coverage is growing. An industrial standards group of Institute of Electrical and Electronic Engineers (IEEE802.11) defines a series of most common WLAN technique standards such as 802.11a, 802.11b and 802.11g successively; then, other task groups appear successively and are committed to developing improved standards involved in the present 802.11 technique, for example, the 802.11n task group raises a request of High Throughput (HT), which supports a data rate of 600 Mbps; the 802.11ac task group further proposes a concept of Very High Throughput (VHT), which increases the data rate to 1 Gbps. Thus, new protocol needs to be backward compatible with the previous protocol.

In the 802.11 standard, one Access Point (AP) and multiple Non-AP Stations (STAs) associated with the AP form a Basic Service Set (BSS). The WLAN defined by the IEEE802.11 enables multiple stations to share a wireless channel by utilizing a mechanism of Carries Sense Multiple Access with Collision Avoidance (CSMA/CA).

In the IEEE 802.11 technique, one channelized set refers to a set consisting of multiple big-bandwidth channels (such as 40 MHz, 80 MHz, 120 MHz, 160 MHz channels) which consist of multiple 20 MHz channels defined from a predefined or fixed starting frequency point within a given frequency band. The 20 MHz channel forming the set also is called a basic channel; other channels consisting of these basic channels also are called big-bandwidth channels. A big-bandwidth channel contains a basic channel which is called a primary channel, wherein the primary channel is configured to broadcast control information. In a channelized set, each basic channel has a unique channel number.

In the technique defined by the IEEE802.11 series standards, an authorization-free Industrial Scientific Medical (ISM) frequency band is channelized into multiple 20 MHz channels according to the bandwidth of the 20 MHz basic channel. The interval between the central frequency points of every two adjacent channels is 5 MHz; and the channel is numbered according to the specified or predefined starting frequency point. The IEEE802.11 uses multiple channels defined above as working channels. For example, on a 2.4 GHz frequency band, the IEEE802.11 defines 14 adjacent 20 MHz channels as available channels, wherein each available channel is overlapped with its adjacent available channel with an interval of 5 MHz between the central frequency points; another example, on a 5 GHz frequency band, the IEEE802.11 defines five 20 MHz channels between 5.735 GHz and 5.835 GHz as available channels, wherein each available channel is not overlapped with its adjacent available channel with an interval of 20 MHz between the central frequency points. The available channel refers to a group of non-overlapped basic channels defined in a channelized set or a set consisting of these basic channels; the working channel refers to an available channel currently used or to be used by a wireless apparatus.

In some conditions, the frequency planning in some countries can not be fully utilized based on the above definition of channelization. For example, on the 5 GHz frequency band in China, the frequency band applicable to the WLAN totally is 125 MHz of frequency band between 5.725 GHz and 5.850 GHz, and there exists a high-efficiency channelization scheme capable of dividing the frequency band into six 20 MHz available channels at present. However, there is a problem of central frequency point offset between this high-efficiency channelization scheme and the existing 5 GHz channelization scheme, so that the WLAN apparatus can not perform simple extension in the high-efficiency channelization scheme like in the existing channelization scheme; particularly when one same WLAN apparatus supports the existing channelization scheme and the high-efficiency channelization scheme simultaneously, the WLAN apparatus can not perform channel scanning according to the existing mechanism and thus can not establish a WLAN network.

Therefore, how to plan the process implemented by an apparatus, which supports the existing channelization scheme and the high-efficiency channelization scheme simultaneously, to perform channel scanning and establish a network is an urgent problem to be solved in the new generation of 802.11 protocol based on big-bandwidth.

SUMMARY

In view of the above, the main purpose of the disclosure is to provide a method and an apparatus for establishing a network in a wireless network, so that a wireless network compatible with the current WLAN can be established when a wireless station supports multiple channelized set schemes within a given frequency band.

In order to achieve the purpose above, the technical scheme of the disclosure is realized as follows.

The disclosure provides a method for establishing a network in a wireless network, including:

selecting, by a wireless station, a working channel and a primary channel which satisfy a bandwidth requirement and an interference level in a channelized set within a given frequency band according to local configuration information and/or through channel scanning and interference detection; and establishing, by the wireless station, a network according to the selected working channel and primary channel.

The wireless station may perform channel scanning and interference detection according to a distribution order of central frequency points of all or part of available channels in all or part of channelized sets supported by the given frequency band.

The wireless station may first perform channel scanning and interference detection on all or part of available channels in one channelized set supported by the given frequency band, and then performs channel scanning and interference detection on all or part of available channels in one or more other channelized sets.

Selecting a working channel and a primary channel through channel scanning or interference detection may specifically include:

if the wireless station finds an available channel satisfying bandwidth and interference requirements in one channelized set through channel scanning and interference detection and no else network utilizes the available channel, then selecting the available channel as a working channel and selecting one fixed or any basic channel in the available channel as a primary channel;

if the wireless station finds an available channel satisfying bandwidth and interference requirements in one channelized set through channel scanning and interference detection but the available channel has been utilized by other networks, then selecting the available channel as a working channel and utilizing a primary channel the same as that of an existing network;

if the wireless station does not find an available channel satisfying bandwidth and interference requirements in all the supported channelized sets, then selecting an available maximum-bandwidth channel which has a bandwidth lower than the bandwidth requirement and satisfies the interference requirement as a working channel, and specifying an available basic channel as a primary channel in a bandwidth scope of the working channel; and if the wireless station does not find an available channel satisfying bandwidth and interference requirements in all supported channelized sets through the above selection modes, then ending the network establishment process.

The local configuration information may include: a supportable channelized set, a bandwidth of a working channel, a primary channel of a working channel.

The method may further include: calculating a central frequency point of the primary channel of the working channel through the following methods according to the local configuration information:

in a given frequency band, utilizing two or more channelized sets to indicate different channelization schemes in a scope of frequencies which are mutually overlapped or partially overlapped, wherein in one channelized set, any two available basic channels are not overlapped at all and an interval between central frequency points of any two available basic channels is an integer multiple of an interval between basic channels;

specifying a unique identification number for each channelized set, or, in a superset consisting of all channelized sets satisfying a frequency planning area code, specifying for each channelized set a unique identification number within a scope of the superset; and for a primary channel of any available channel in a channelized set, calculating a central frequency point by adding one same starting frequency point given by the channelized set to a frequency offset obtained according to a sequence number of the basic channel.

The method may further include:

periodically broadcasting, by the wireless station, a beacon message and/or sending a scanning feedback message on the primary channel of the selected working channel, wherein the beacon message and/or the scanning feedback message include(s): information of the working channel, information of a channelized set to which the working channel of the wireless station belongs.

The disclosure also provides an apparatus for establishing a network in a wireless network, including:

a channel selection module, which is configured to select a working channel and a primary channel which satisfy a bandwidth requirement and an interference level in a channelized set within a given frequency band according to local configuration information of a wireless station and/or through channel scanning and interference detection; and a network establishment module, which is configured to establish a network according to the selected working channel and primary channel.

The channel selection module may be further configured to perform channel scanning and interference detection according to a distribution order of central frequency points of all or part of available channels in all or part of channelized sets supported by the given frequency band.

The channel selection module may be further configured to first perform channel scanning and interference detection on all or part of available channels in one channelized set supported by the given frequency band, and then to perform channel scanning and interference detection on all or part of available channels in one or more other channelized sets.

The channel selection module may be further configured to:

when an available channel satisfying bandwidth and interference requirements is found in one channelized set through channel scanning and interference detection and no else network utilizes the available channel, select the available channel as a working channel and select one fixed or any basic channel in the available channel as a primary channel;

when an available channel satisfying bandwidth and interference requirements is found in one channelized set through channel scanning and interference detection but the available channel has been utilized by other networks, select the available channel as a working channel and utilize a primary channel the same as that of an existing network;

when no available channel satisfying bandwidth and interference requirements is found in all supported channelized sets, select an available maximum-bandwidth channel which has a bandwidth lower than the bandwidth requirement and satisfies the interference requirement as a working channel, and specify an available basic channel as a primary channel in a bandwidth scope of the working channel; and when no available channel satisfying bandwidth and interference requirements is found in all supported channelized sets through the above selection modes, end the network establishment process.

The local configuration information may include: a supportable channelized set, a bandwidth of a working channel, a primary channel of a working channel.

The channel selection module may be further configured to calculate a central frequency point of the primary channel of the working channel through the following methods according to the local configuration information:

in a given frequency band, utilizing two or more channelized sets to indicate different channelization schemes in a scope of frequencies which are mutually overlapped or partially overlapped, wherein in one channelized set, any two available basic channels are not overlapped at all and an interval between central frequency points of any two available basic channels is an integer multiple of an interval between basic channels;

specifying a unique identification number for each channelized set, or, in a superset consisting of all channelized sets satisfying a frequency planning area code, specifying for each channelized set a unique identification number within a scope of the superset; and for a primary channel of any available channel in a channelized set, calculating a central frequency point by adding one same starting frequency point given by the channelized set to a frequency offset obtained according to a sequence number of the basic channel.

The apparatus may further include a message sending module which is configured to periodically broadcast a beacon message and/or send a scanning feedback message on the primary channel of the selected working channel, wherein the beacon message and/or the scanning feedback message include(s): information of the working channel, information of a channelized set to which the working channel of the wireless station belongs.

In the method and the apparatus provided by the disclosure for establishing a network in a wireless network, the wireless station selects a working channel and a primary channel which satisfy a bandwidth requirement and an interference level in one or more channelized sets within a given frequency band by calculating local configuration information and/or through channel scanning and interference detection, and establishes a network. Through the disclosure, a wireless network compatible with the current WLAN can be established when the wireless station supports multiple channelized set schemes within a given frequency band, and the utilization of available spectrum resources is maximized.

DETAILED DESCRIPTION

The technical scheme of the disclosure is described below in further detail in conjunction with accompanying drawings and specific embodiments.

Figure 1:
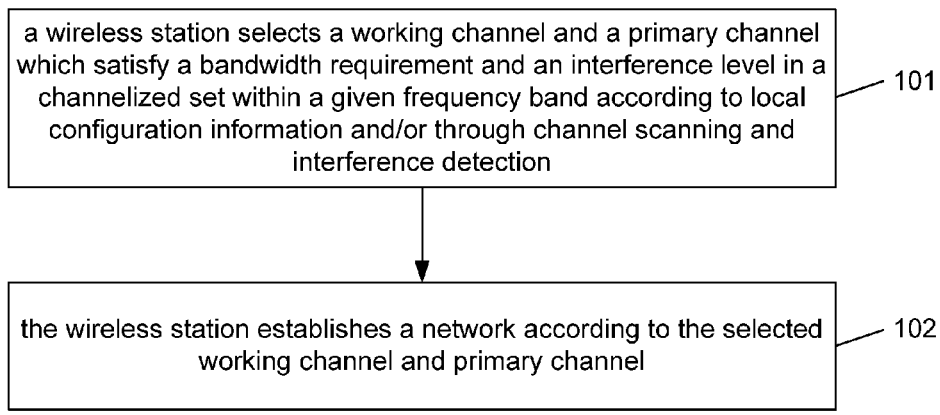
FIG. 1 shows a flowchart of a method for establishing a network in a wireless network.

A method provided by the disclosure for establishing a network in a wireless network, as shown in FIG. 1, mainly includes the following steps.

Step 101: A wireless station selects a working channel and a primary channel which satisfy a bandwidth requirement and an interference level in a channelized set within a given frequency band (the frequency band includes one or more different channelized sets) according to local configuration information and/or through channel scanning and interference detection.

The operation of selecting a working channel and a primary channel might include one or a combination of more of the following methods:

Method 1: the wireless station performs channel scanning and interference detection in one channelized set within a given frequency band, and performs channel scanning and interference detection in one or more other channelized sets, and selects a working channel and a primary channel according to the result of channel scanning and interference detection.

For example, the wireless station first performs channel scanning and interference detection according to the distribution order of central frequency points of all or part of available channels in one channelized set, and then performs channel scanning and interference detection according to the distribution order of central frequency points of all or part of available channels in another channelized set.

The wireless station also can perform channel scanning and interference detection according to the distribution order of central frequency points of all or part of available channels in all or part of channelized sets supported by the given frequency band.

If the wireless station finds an available channel satisfying bandwidth and interference requirements in a channelized set through channel scanning and interference detection and no else network utilizes the available channel, the wireless station selects the available channel as a working channel and selects one fixed or any basic channel in the available channel as a primary channel.

If the wireless station finds an available channel satisfying bandwidth and interference requirements in one channelized set through channel scanning and interference detection but the available channel has been utilized by other networks, the wireless station selects the available channel as a working channel and utilizes a primary channel the same as that of an existing network.

If the wireless station does not find an available channel satisfying bandwidth and interference requirements in all the supported channelized sets, the wireless station selects an available maximum-bandwidth channel which has a bandwidth lower than the bandwidth requirement and satisfies the interference requirement as a working channel, and specifies in the bandwidth scope of the working channel an available basic channel as a primary channel.

If the wireless station does not find an available channel satisfying bandwidth and interference requirements in all supported channelized sets through the above selection modes, the wireless station ends the network establishment process.

Method 2: the wireless station selects a working channel and a primary channel according to local configuration information. The local configuration information includes: a supportable channelized set, a bandwidth of a working channel, a primary channel of a working channel.

The wireless station calculates the central frequency point of the primary channel of the working channel according to parameters locally configured, such as a supportable channelized set, the bandwidth of the working channel, and the primary channel of the working channel, wherein the calculation method includes:

1. in a given frequency band, a system utilizes two or more channelized sets to indicate different channelization schemes in a scope of frequencies which are mutually overlapped or partially overlapped; for example, in an ISM frequency band between 5.725 GHz and 5.850 GHz, one channelization scheme is defined by dividing the frequency band into 5 available non-overlapped 20 MHz basic channels from 5.725 GHz to 5.850 GHz, wherein the channel numbers are 149, 153, 157, 161, 165 respectively, and the starting frequency is 5 GHz; another channelization scheme is defined by dividing the frequency band into 6 available non-mutually overlapped 20 MHz basic channels from 5.735 GHz to 5.835 GHz, wherein the channel numbers are 200, 204, 208, 212, 216, 220 respectively, and the starting frequency is 4.7375 GHz;

2. in one channelized set, any two available basic channels are not overlapped at all and the interval between the central frequency points of any two available basic channels is an integer multiple of the interval between the basic channels;

3. the system specifies a unique identification number for each channelized set, or, in a superset consisting of all channelized sets satisfying a frequency planning area code, the system specifies for each channelized set a unique identification number within the scope of the superset;

4. for the primary channel of any available channel in a channelized set, the central frequency point can be calculated by adding one same starting frequency point specified by the channelized set to a frequency offset obtained according to the sequence number of the basic channel.

Step 102: The wireless station establishes a network according to the selected working channel and primary channel.

The wireless station establishes a network according to the selected working channel. The wireless station sends information of the working channel by periodically broadcasting a beacon message and/or sending a scanning feedback message on the primary channel of the selected working channel. The beacon message and/or the scanning feedback message include(s) information of a channelized set to which the working channel of the wireless station belongs. The information of the working channel and the information of the channelized set can be obtained through the following methods:

1. in a given frequency band, a system utilizes two or more channelized sets to indicate different channelization schemes in a scope of frequencies which are mutually overlapped or partially overlapped;

2. in one channelized set, any two available basic channels are not overlapped at all and the interval between the central frequency points of any two available basic channels is an integer multiple of the interval between the basic channels;

3. the system specifies a unique identification number for each channelized set, or, in a superset consisting of all channelized sets satisfying a frequency planning area code, the system specifies for each channelized set a unique identification number within the scope of the superset;

4. for the primary channel of any available channel in one channelized set, the central frequency point can be calculated by adding one same starting frequency point specified by the channelized set to a frequency offset obtained according to the sequence number of the basic channel.

Hereinafter, the method for establishing a network in a wireless network is described in further detail in conjunction with specific embodiments.

Figure 2:
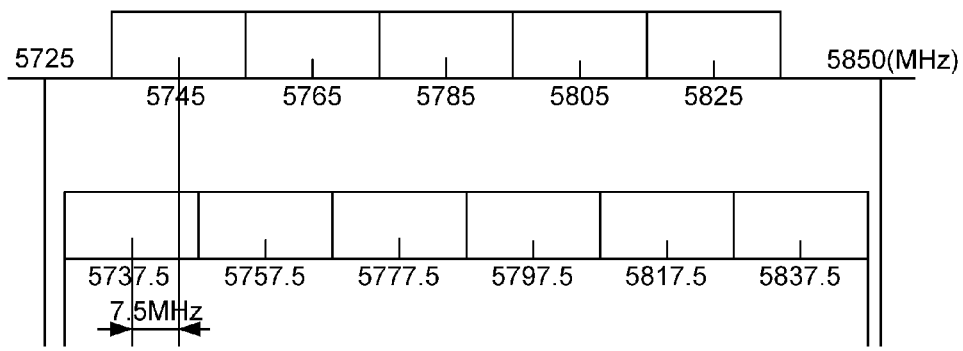
FIG. 2 shows a diagram of a first type of channelization scheme and a second type of channelization scheme in an embodiment of the disclosure.

In an embodiment of the disclosure, the involved channel bandwidths include 20 MHz, 40 MHz, 80 MHz, 120 MHz, 160 MHz and other larger channel bandwidths with 20 MHz as a unit. Hereinafter, take a frequency band between 5.725 GHz and 5.850 GHz for example in the following embodiments. The first type of channelized set includes five 20 MHz basic channels defined in the frequency band between 5.735 GHz and 5.835 GHz meeting existing IEEE802.11 standards, and a 40 MHz channel and a 80 MHz channel which consist of the five 20 MHz basic channels; the second type of channelized set includes six 20 MHz basic channels defined in the frequency band between 5.725 GHz and 5.850 GHz meeting existing IEEE802.11 standards, and a 40 MHz channel, a 80 MHz channel and a 120 MHz channel which consist of the six 20 MHz basic channels, as shown in FIG. 2.

In a first embodiment of the disclosure, the method for establishing a wireless network according to local channel configuration by a wireless station mainly includes the following operations:

the wireless station calculates the bandwidth of a working channel to be used and the central frequency point of a primary channel according to locally configured parameters related to the working channel, wherein the locally configured parameters related to the working channel can be implemented through the following methods:

1. a frequency planning class identification number is utilized to indicate multiple continuous non-overlapped channels, and a starting frequency used by the channels and an interval between two adjacent channels;

2. a frequency planning class identification number is utilized to indicate the primary channel of each big-bandwidth channel in a big-bandwidth channel set;

3. a basic channel is indicated through a frequency planning class identification number and a channel number; and the central frequency point of the basic channel can be calculated through the specified starting frequency;

4. a big-bandwidth channel can be indicated through the channel interval of the set to which the big-bandwidth channel belongs and through the sequence number of the contained basic channel which has smallest central frequency point; the central frequency point of other basic channels can be calculated in turn.

For example, a possible frequency planning class identification number and the corresponding starting frequency point, channel interval and channel set can be defined as in the following Table 1 (refer to FIG. 2):

TABLE 1

| Frequency Planning Class Identification Number | Starting Frequency Point (GHz) | Channel Interval (MHz) | Channel Set |
|---|---|---|---|
| 1 | 5 | 20 | 149, 153, 157, 161, 165 |
| 2 | 5 | 40 | 149, 157 |
| 3 | 5 | 80 | 149 |
| 4 | 4992.5 | 20 | 149, 153, 157, 161, 165, 169 |
| 5 | 4992.5 | 40 | 149, 157, 165 |
| 6 | 4992.5 | 80 | 149 |
| 7 | 4992.5 | 120 | 149 |
| 8 | 4992.5 | 80 | 157 |

The lowest central frequency point of the basic channel of the working channel is calculated based on the following formula: central frequency point of channel=starting frequency point+channel interval×channel number.

The wireless station establishes a wireless network on the working channel according to the calculated central frequency point. The wireless station broadcasts a beacon message containing the working channel number and the frequency planning identification number on the primary channel of the working channel, and contains in a transmitted scanning feedback message the beacon message indicating the working channel number and the frequency planning identification number.

In a second embodiment of the disclosure, the channel parameter locally configured by the wireless station needs to meet the requirements of national frequency planning; the bandwidth of the working channel is 80 MHz; and no fixed smallest channel number or primary channel number is specified. In this embodiment, the method for configuring a wireless network through channel scanning and interference detection by the wireless station mainly includes the following operations:

the wireless station first performs channel scanning and interference detection on all or part of basic channels of all available 80 MHz channels contained in the second type of channelized set. If no available 80 MHz channel is found satisfying interference requirements, the wireless station performs channel scanning and interference detection on all or part of basic channels of all available 80 MHz channels contained in the first type of channelized set.

When performing channel scanning and interference detection on the basic channel, it is needed to calculate the central frequency point of the basic channel, wherein the calculation can be implemented through the following methods:

1. a frequency planning class identification number is utilized to indicate multiple continuous non-overlapped channels, and a starting frequency used by the channels and an interval between two adjacent channels;

2. a frequency planning class identification number is utilized to indicate the primary channel of each big-bandwidth channel in a big-bandwidth channel set;

3. a basic channel is indicated through a frequency planning class identification number and a channel number; and the central frequency point of the basic channel can be calculated through the specified starting frequency;

4. a big-bandwidth channel can be indicated through the channel interval of the set to which the big-bandwidth channel belongs and through the sequence number of the contained basic channel which has the smallest central frequency point; the central frequency point of other basic channels can be calculated in turn.

Figure 3:
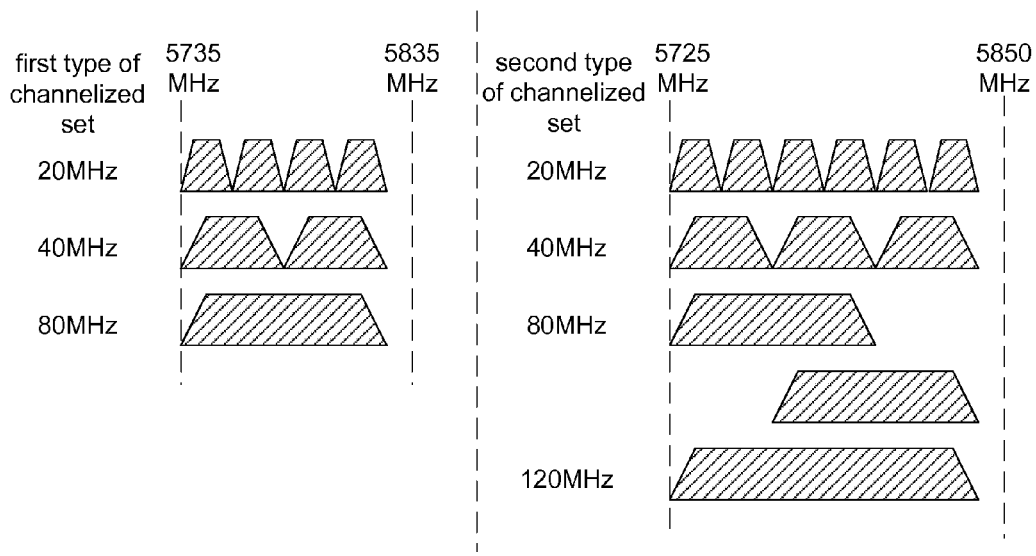
FIG. 3 shows a first diagram of the first type of channelization scheme and the second type of channelization scheme in an embodiment of the disclosure.
Figure 4:
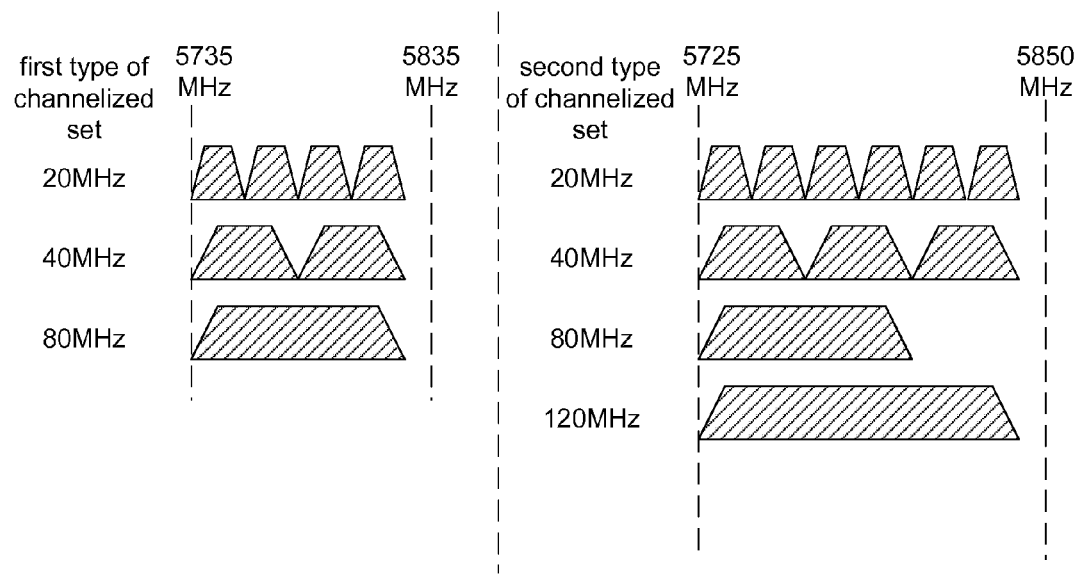
FIG. 4 shows a second diagram of the first type of channelization scheme and the second type of channelization scheme in an embodiment of the disclosure.

For example, a possible frequency planning class identification number and the corresponding bandwidth, starting frequency point and channel set can be defined as in the following Table 2 (refer to FIG. 3):

TABLE 2

| Frequency Planning Class Identification Number | Starting Frequency Point (GHz) | Channel Interval (MHz) | Channel Set |
| --- | --- | --- | --- |
| 1 | 5 | 20 | 149, 153, 157, 161, 165 |
| 2 | 5 | 40 | 149, 157 |
| 3 | 5 | 80 | 149 |
| 4 | 4737.5 | 20 | 200, 204, 208, 212, 216, 220 |
| 5 | 4737.5 | 40 | 200, 208, 216 |
| 6 | 4737.5 | 80 | 200 |
| 7 | 4737.5 | 120 | 200 |

The central frequency point of the basic channel of the working channel is calculated based on the following formula: central frequency point of basic channel=starting frequency point+channel interval of basic channel×channel number of basic channel.

If the wireless station finds an available 80 MHz channel meeting interference requirements in the second type of channelized set, then the wireless station selects this channel as a working channel. If no else Basic Service Set (BSS) is scanned on this channel, the wireless station selects a fixed or any one basic channel as a primary channel; if other BSSs are scanned on this channel, the wireless station selects a primary channel the same as that of at least one BSS.

If the wireless station does not find an available 80 MHz channel meeting interference requirements in the second type of channelized set, but finds an available 80 MHz channel meeting interference requirements in the first type of channelized set, then the wireless station selects this channel as a working channel. If no else BSS is scanned on this channel, the wireless station selects a fixed or any one basic channel as a primary channel; if other BSSs are scanned on this channel, the wireless station selects a primary channel the same as that of at least one BSS.

If the wireless station does not find an available 80 MHz channel meeting interference requirements in both two types of channelized sets, the working bandwidth is set to 40 MHz, and the above operations is repeated; if selecting a 40 MHz working channel fails, then the working bandwidth is set to 20 MHz, and the above operations continues to repeat;

or, if the wireless station does not find an available 80 MHz channel meeting interference requirements in both two types of channelized sets, the wireless station selects any one available 80 MHz channel in the second type of channelized set as a working channel, and selects a fixed or any one basic channel therein as a primary channel;

or, if the wireless station does not find an available 80 MHz channel meeting interference requirements in both two types of channelized sets, the wireless station selects any one available 80 MHz channel in the first type of channelized set as a working channel, and selects a fixed or any one basic channel therein as a primary channel;

or, if the wireless station does not find an available 80 MHz channel meeting interference requirements in both two types of channelized sets, the wireless station exits the process of establishing a network.

After selecting a working channel, the wireless station establishes a wireless network on the selected working channel. The wireless station broadcasts a beacon message containing the working channel number and the frequency planning identification number on the primary channel of the working channel, and contains in a transmitted scanning feedback message the beacon message indicating the working channel number and the frequency planning identification number.

In addition, corresponding to the above method for establishing a network in a wireless network, the disclosure also provides an apparatus for establishing a network in a wireless network, wherein the apparatus is applied to a wireless station and includes: a channel selection module and a network establishment module, wherein the channel selection module is configured to select a working channel and a primary channel which satisfy a bandwidth requirement and an interference level in a channelized set within a given frequency band according to local configuration information of the wireless station and/or through channel scanning and interference detection; the network establishment module is configured to establish a network according to the selected working channel and primary channel.

The channel selection module is further configured to perform channel scanning and interference detection according to the distribution order of central frequency points of all or part of available channels in all or part of channelized sets supported by the given frequency band.

The channel selection module also can be configured to first perform channel scanning and interference detection on all or part of available channels in one channelized set supported by the given frequency band, and then to perform channel scanning and interference detection on all or part of available channels in one or more other channelized sets.

Selecting a working channel and a primary channel through channel scanning or interference detection specifically includes:

when an available channel satisfying bandwidth and interference requirements is found in one channelized set through channel scanning and interference detection and no else network utilizes the available channel, selecting the available channel as a working channel and selecting one fixed or any basic channel in the available channel as a primary channel;

when an available channel satisfying bandwidth and interference requirements is found in a channelized set through channel scanning and interference detection but the available channel has been utilized by other networks, selecting the available channel as a working channel and utilizing a primary channel the same as that of an existing network;

when no available channel satisfying bandwidth and interference requirements is found in all the supported channelized sets, selecting an available maximum-bandwidth channel which has a bandwidth lower than the bandwidth requirement and satisfies the interference requirement as a working channel;

when no available channel satisfying bandwidth and interference requirements is found in all supported channelized sets through the above selection modes, ending the network establishment process.

The channel selection module is further configured to calculate the central frequency point of the primary channel of the working channel through the following methods according to the local configuration information:

in a given frequency band, utilizing two or more channelized sets to indicate different channelization schemes in a scope of frequencies which are mutually overlapped or partially overlapped, wherein, in one channelized set, any two available basic channels are not overlapped at all and the interval between the central frequency points of any two available basic channels is an integer multiple of the interval between the basic channels;

specifying a unique identification number for each channelized set, or, in a superset consisting of all channelized sets satisfying a frequency planning area code, specifying for each channelized set a unique identification number within the scope of the superset;

for the primary channel of any available channel in a channelized set, calculating the central frequency point by adding one same starting frequency point specified by the channelized set to a frequency offset obtained according to the sequence number of the basic channel.

In addition, the apparatus can further include: a message sending module, which is configured to periodically broadcast a beacon message and/or send a scanning feedback message on the primary channel of the selected working channel, wherein the beacon message and/or the scanning feedback message include(s): information of the working channel, information of a channelized set to which the working channel of the wireless station belongs.

The above are only the preferred embodiments of the disclosure, and are not intended to limit the scope of protection of the disclosure.

What is claimed is:

1. A method for establishing a network in a wireless network, comprising:
    selecting, by a wireless station, a working channel and a primary channel which satisfy a bandwidth requirement and an interference level in a channelized set within a given frequency band according to local configuration information and/or through channel scanning and interference detection, wherein the local configuration information includes a supportable channelized set, a bandwidth of a working channel, a primary channel of a working channel;
    calculating a central frequency point of the primary channel of the working channel through the following methods according to the local configuration information:
        in a given frequency band, utilizing two or more channelized sets to indicate different channelization schemes in a scope of frequencies which are mutually overlapped or partially overlapped, wherein in one channelized set, any two available basic channels are not overlapped at all and an interval between central frequency points of any two available basic channels is an integer multiple of an interval between basic channels;
        specifying a unique identification number for each channelized set, or, in a superset consisting of all channelized sets satisfying a frequency planning area code, specifying for each channelized set a unique identification number within a scope of the superset; and
        for a primary channel of any available channel in a channelized set, calculating a central frequency point by adding one same starting frequency point specified by the channelized set to a frequency offset obtained according to a sequence number of the basic channel; and
    establishing, by the wireless station, a network according to the selected working channel and primary channel.

2. The method for establishing a network in a wireless network according to claim 1, wherein the wireless station performs channel scanning and interference detection according to a distribution order of central frequency points of all or part of available channels in all or part of channelized sets supported by the given frequency band.

3. The method for establishing a network in a wireless network according to claim 2, further comprising:
    periodically broadcasting, by the wireless station, a beacon message and/or sending a scanning feedback message on the primary channel of the selected working channel, wherein the beacon message and/or the scanning feedback message comprise(s): information of the working channel, information of a channelized set to which the working channel of the wireless station belongs.

4. The method for establishing a network in a wireless network according to claim 1, wherein the wireless station first performs channel scanning and interference detection on all or part of available channels in one channelized set supported by the given frequency band, and then performs channel scanning and interference detection on all or part of available channels in one or more other channelized sets.

5. The method for establishing a network in a wireless network according to claim 4, further comprising:
    periodically broadcasting, by the wireless station, a beacon message and/or sending a scanning feedback message on the primary channel of the selected working channel, wherein the beacon message and/or the scanning feedback message comprise(s): information of the working channel, information of a channelized set to which the working channel of the wireless station belongs.

6. The method for establishing a network in a wireless network according to claim 1, wherein the selecting a working channel and a primary channel through channel scanning or interference detection comprises:
    if the wireless station finds, through channel scanning and interference detection, that an available channel satisfies bandwidth and interference requirements in one channelized set and that no else network utilizes the available channel, then selecting the available channel as a working channel and selecting one fixed or any basic channel in the available channel as a primary channel;
    if the wireless station finds, through channel scanning and interference detection, that an available channel satisfying bandwidth and interference requirements in one channelized set but the available channel has been utilized by other networks, then selecting the available channel as a working channel and utilizing a primary channel the same as that of an existing network;
    if the wireless station does not find an available channel satisfying bandwidth and interference requirements in all supported channelized sets, then selecting an available maximum-bandwidth channel which has a bandwidth lower than the bandwidth requirement and satisfies the interference requirement as a working channel, and specifying an available basic channel as a primary channel in a bandwidth scope of the working channel; and if the wireless station does not find an available channel satisfying bandwidth and interference requirements in all supported channelized sets through the above selection modes, then ending the network establishment process.

7. The method for establishing a network in a wireless network according to claim 6, further comprising:
periodically broadcasting, by the wireless station, a beacon message and/or sending a scanning feedback message on the primary channel of the selected working channel, wherein the beacon message and/or the scanning feedback message comprise(s): information of the working channel, information of a channelized set to which the working channel of the wireless station belongs.

8. The method for establishing a network in a wireless network according to claim 1, further comprising:
periodically broadcasting, by the wireless station, a beacon message and/or sending a scanning feedback message on the primary channel of the selected working channel, wherein the beacon message and/or the scanning feedback message comprise(s): information of the working channel, information of a channelized set to which the working channel of the wireless station belongs.

9. An apparatus for establishing a network in a wireless network, comprising:
a memory storing programming instructions; and
a processor configured to be capable of executing the stored programming instructions to perform steps comprising:
selecting, by a wireless station, a working channel and a primary channel which satisfy a bandwidth requirement and an interference level in a channelized set within a given frequency band according to local configuration information and/or through channel scanning and interference detection, wherein the local configuration information includes a supportable channelized set, a bandwidth of a working channel, a primary channel of a working channel;
calculating a central frequency point of the primary channel of the working channel through the following methods according to the local configuration information:
in a given frequency band, utilizing two or more channelized sets to indicate different channelization schemes in a scope of frequencies which are mutually overlapped or partially overlapped, wherein in one channelized set, any two available basic channels are not overlapped at all and an interval between central frequency points of any two available basic channels is an integer multiple of an interval between basic channels;
specifying a unique identification number for each channelized set, or, in a superset consisting of all channelized sets satisfying a frequency planning area code, specifying for each channelized set a unique identification number within a scope of the superset; and
for a primary channel of any available channel in a channelized set, calculating a central frequency point by adding one same starting frequency point specified by the channelized set to a frequency offset obtained according to a sequence number of the basic channel; and
establishing, by the wireless station, a network according to the selected working channel and primary channel.

10. The apparatus for establishing a network in a wireless network according to claim 9, wherein the processor is further configured to be capable of executing the stored programming instructions to perform steps further comprising:
performing channel scanning and interference detection according to a distribution order of central frequency points of all or part of available channels in all or part of channelized sets supported by the given frequency band.

11. The apparatus for establishing a network in a wireless network according to claim 10, wherein the processor is further configured to be capable of executing the stored programming instructions to perform steps further comprising:
periodically broadcasting a beacon message and/or sending a scanning feedback message on the primary channel of the selected working channel, wherein the beacon message and/or the scanning feedback message comprise(s) information of the working channel, and information of a channelized set to which the working channel of the wireless station belongs.

12. The apparatus for establishing a network in a wireless network according to claim 9, wherein the processor is further configured to be capable of executing the stored programming instructions to perform steps further comprising:
first performing channel scanning and interference detection on all or part of available channels in one channelized set supported by the given frequency band, and then performing channel scanning and interference detection on all or part of available channels in one or more other channelized sets.

13. The apparatus for establishing a network in a wireless network according to claim 12, wherein the processor is further configured to be capable of executing the stored programming instructions to perform steps further comprising:
periodically broadcasting a beacon message and/or sending a scanning feedback message on the primary channel of the selected working channel, wherein the beacon message and/or the scanning feedback message comprise(s) information of the working channel, and information of a channelized set to which the working channel of the wireless station belongs.

14. The apparatus for establishing a network in a wireless network according to claim 9, wherein the processor is further configured to be capable of executing the stored programming instructions to perform steps further comprising:
when an available channel satisfying bandwidth and interference requirements is found in one channelized set through channel scanning and interference detection, and no else network utilizes the available channel, selecting the available channel as a working channel and selecting one fixed or any basic channel in the available channel as a primary channel;
when an available channel satisfying bandwidth and interference requirements is found in one channelized set through channel scanning and interference detection, but the available channel has been utilized by other networks, selecting the available channel as a working channel and utilizing a primary channel the same as that of an existing network;
when no available channel satisfying bandwidth and interference requirements is found in all supported channelized sets, selecting an available maximum-bandwidth channel which has a bandwidth lower than the bandwidth requirement and satisfies the interference requirement as a working channel, and specifying an available basic channel as a primary channel in a bandwidth scope of the working channel; and when no available channel satisfying bandwidth and interference requirements is found in all supported channelized sets through the above selection modes, ending the network establishment process.

15. The apparatus for establishing a network in a wireless network according to claim 14, wherein the processor is further configured to be capable of executing the stored programming instructions to perform steps further comprising:

periodically broadcasting a beacon message and/or sending a scanning feedback message on the primary channel of the selected working channel, wherein the beacon message and/or the scanning feedback message comprise(s) information of the working channel, and information of a channelized set to which the working channel of the wireless station belongs.

16. The apparatus for establishing a network in a wireless network according to claim 9, wherein the processor is further configured to be capable of executing the stored programming instructions to perform steps further comprising:

periodically broadcasting a beacon message and/or sending a scanning feedback message on the primary channel of the selected working channel, wherein the beacon message and/or the scanning feedback message comprise(s) information of the working channel, and information of a channelized set to which the working channel of the wireless station belongs.

\* \* \* \* \*